July 20, 1954    W. L. PAULISON, JR., ET AL    2,684,078
FLUID FLOW CONTROL SYSTEM Filed Oct. 9, 1948      2 Sheets-Sheet 1

INVENTORS
WILLIAM L. PAULISON JR.
AND WILLIAM P. DAVENPORT
BY Raymond W. Junkins
ATTORNEY July 20, 1954  W. L. PAULISON, JR., ET AL  2,684,078
FLUID FLOW CONTROL SYSTEM Filed Oct. 9, 1948  2 Sheets-Sheet 2

INVENTORS
WILLIAM L. PAULISON JR.
AND WILLIAM P. DAVENPORT
BY Raymond W. Junkins
ATTORNEY Patented July 20, 1954

2,684,078

UNITED STATES PATENT OFFICE 2,684,078

FLUID FLOW CONTROL SYSTEM

William L. Paulison, Jr., Ridgewood, and William P. Davenport, Verona, N. J., assignors to Bailey Meter Company, a corporation of Delaware Application October 9, 1948, Serial No. 53,664

16 Claims. (Cl. 137—414)

This invention relates to systems for controlling the flow of fluid to an accumulator or storage chamber so as to maintain predetermined conditions therein.

It is sometimes necessary that large quantities of a fluid be supplied during short periods of time to points of use for performing certain functions, and these periods may be followed by comparatively long periods during which little or no fluid is required. It is not usually practical to provide equipment that is capable of delivering the fluid from its original source in such quantities for only short periods. There may be provided in such cases an accumulator or storage chamber which is capable of storing the fluid needed to satisfy the demand, and the fluid may be supplied to the accumulator at reduced rates in accordance with changes in conditions, such as pressure, temperature, liquid level, etc., within the accumulator.

Our invention contemplates a system for controlling the supply of a fluid, such as steam or air, to an accumulator in accordance with changes in pressure therein. Any increase or decrease in the pressure from predetermined values results in the operation of valve means to reduce or increase the fluid supply, and flow responsive means tends to maintain the supply constant at the rate determined by the existing pressure. In a preferred form of our invention means are provided for increasing the rate of valve closing as the pressure increases over a predetermined amount from a desired value, and the system then remains biased so that a reduced rate of flow is obtained when the pressure returns again to the desired value. As the pressure drops below some desired value, means operate to increase the opening of the valve, and a pressure drop over a predetermined amount from the desired value results in a reduction of the bias so that a greater opening of the valve is obtained for the pressure then existing in the accumulator. In some cases it may be necessary that a liquid be supplied to the accumulator or storage chamber so as to maintain a liquid level therein within a predetermined range. It will be appreciated that means responsive to changes in the liquid level may be used in place of the pressure responsive devices of the system mentioned above for controlling the operation of valve means regulating the flow of liquid. In other cases it may be necessary that large volumes of a liquid, such as water, be supplied at some predetermined high temperature. In such cases a heating fluid, such as steam, may be supplied to an accumulator containing the liquid, and the steam flow may be regulated by means operating in response to temperatures of the heated liquid.

An object of our invention is to provide an improved system for controlling the flow of fluid to an accumulator so as to maintain predetermined conditions therein. Another object is to provide a system for controlling the flow of a fluid to an accumulator or storage chamber so as to maintain conditions, such as pressure, temperature, liquid level, etc., in the chamber within a predetermined range. Still another object is to provide a system which is operative to maintain a predetermined flow of fluid to an accumulator as long as conditions therein remain within a given range, and which is biased automatically to maintain a different rate of flow if the conditions exceed predetermined limits. Yet another object is to provide an improved system for varying the rate of fluid flow to an accumulator in response to pressure changes therein, and operating on an increase in the pressure above a predetermined value for reducing rapidly the rate of flow.

In the accompanying drawings there are shown for purposes of illustration several forms which our invention may assume in practice.

Figure 1:
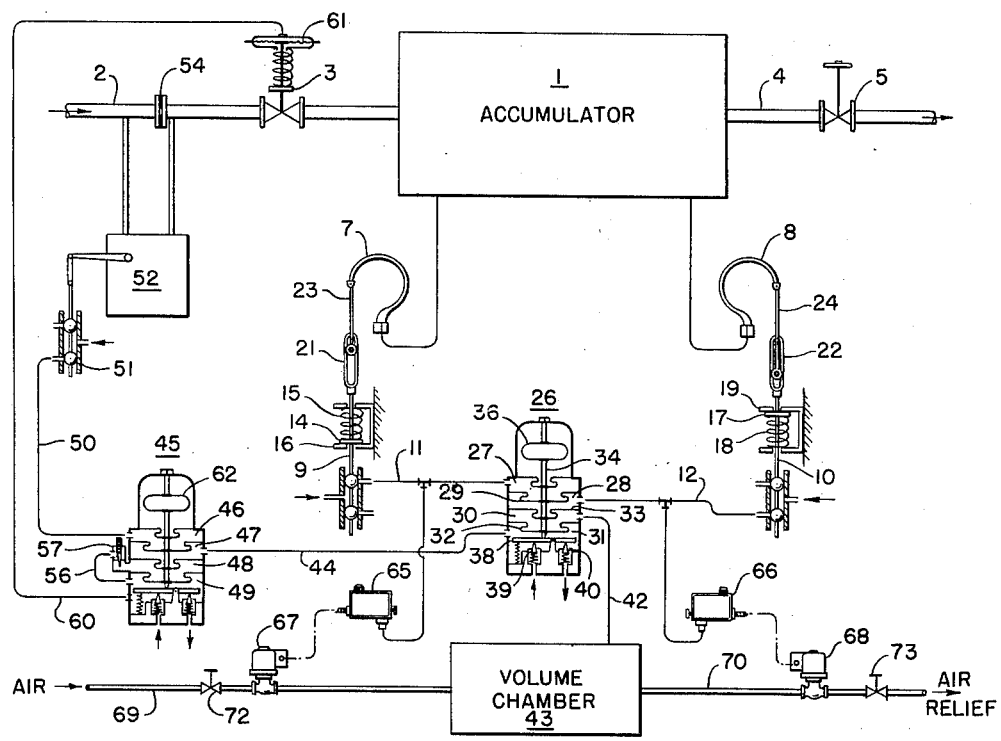
Fig. 1 is a schematic diagram of a preferred form of our improved control system.
Figure 2:
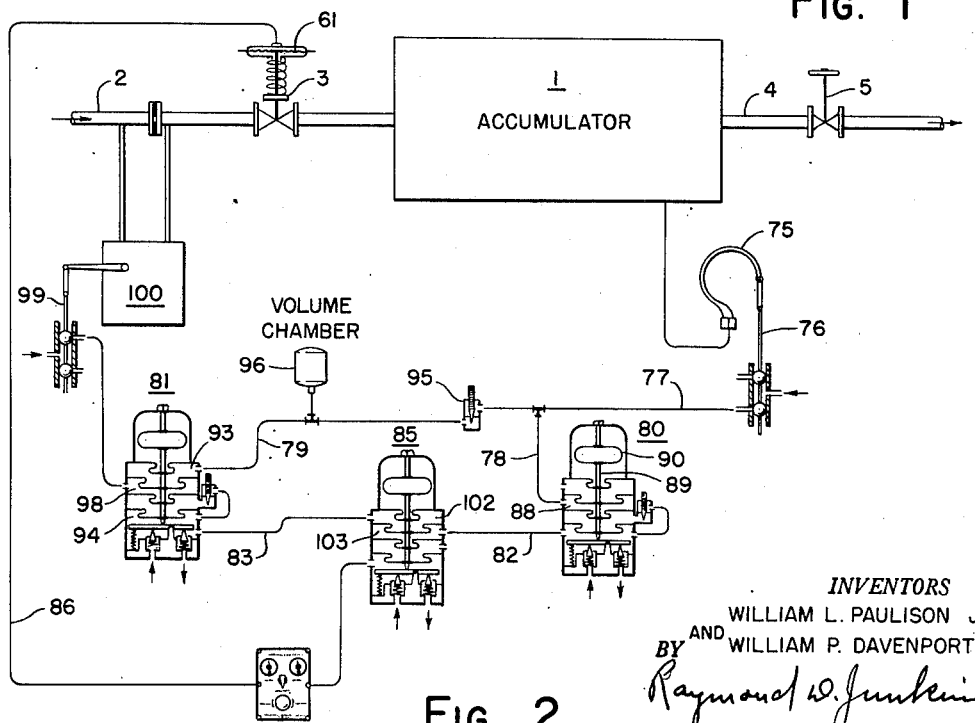
Fig. 2 is a schematic diagram of another form of our control system.

Referring to the drawings it will be noted that there is shown in Figs. 1 and 2 an accumulator or storage chamber 1 to which a fluid is supplied through a conduit 2 under the control of a pressure responsive valve 3. A conduit 4 delivers fluid from the accumulator under the control of a valve 5 to some point of use. The valve 5 as shown herein is manually operated to regulate the flow of fluid, but it may be operated as well by any suitable automatic means, not shown. This valve is adapted to pass a much larger flow of fluid in its full open position than is supplied through the conduit 2 when the valve 3 is fully opened. The valve 5 is opened only short periods of time, and the valve 3 is regulated to supply fluid to the accumulator in response to changes in the conditions therein.

In the system of Fig. 1 the valve 3 is regulated to maintain the pressure in the accumulator within a predetermined range, such as 120 to 160 p. s. i. It will be appreciated that these are only arbitrary values and that the limits of the range may be established at any desired values. Pressure responsive devices 7 and 8 are subjected to the pressures in the accumulator and are operatively connected to pilot valves 9 and 10 for controlling the connection of conduits 11 and 12 to a pressure fluid supply and to the atmosphere. These pilot valves are disclosed in the Johnson Patent 2,054,464 and need not be described in detail herein. It is sufficient to say that the valve 9 is arranged to increase the pressure in the conduit 11 as the device 7 moves it upwardly from the position shown, while the valve 10 is arranged to increase the pressure in the conduit 12 when it is moved downwardly by the device 8. Mounted on the stem of the valve 9 is a plate 14 which is yieldingly urged by a spring 15 into engagement with a stationary frame 16. A similar plate 17 is mouned on the stem of the valve 10 and is urged by a spring 18 into engagement with a stationary frame 19. With the arrangement shown, the valve 9 may be moved from its normal position only in an upward direction while the valve 10 may be moved from its normal position only in a downward direction. The plates 14 and 17 may be adjustably connnected to the valve stems in any suitable manner so that the valves may be adjusted to supply equal or zero pressures to the conduits 11 and 12 when in their normal positions. Adjustably connected to the upper ends of the valve stems are members 21 and 22 having elongated slots which slideably receive head portions of links 23 and 24 connected to the pressure responsive devices 7 and 8, respectively. The member 21 is so arranged that the head portion of the link 23 is moved to the upper end of its slot when the pressure in the accumulator increases to the maximum desired value, and the member 22 is arranged so that the head portion of the link 24 is moved to the lower end of its slot when the accumulator pressure drops to the lower limit of the pressure range.

A relay 26 is provided with a pair of chambers 27 and 28 separated by a flexible partition 29, and a second pair of chambers 30 and 31 separated by a flexible partition 32. A stationary partition 33 separates the pairs of chambers, and an elongated member 34 extends through the chambers and is connected to the flexible partitions and to a flexible sealing element carried by the stationary partition. A spring 36 urges the member 34 downwardly into engagement with a pivoted beam 38 which actuates supply and exhaust valves 39 and 40 for controlling the flow of pressure fluid relative to the chamber 31. In the normal position of the beam, the valves 39 and 40 are both closed. Movement of the member 34 downwardly results in a swinging of the beam to open the supply valve 39, and an upward movement of the member from its normal position results in an opening of the exhaust valve 40. If the pressures in the chambers 27 and 28 are equal and the pressure in the chamber 30 is atmospheric, then the beam 38 is actuated by the spring 36 to unseat the supply valve until the pressure in the chamber 31 is equal to the force exerted by the spring. When the pressure in the chamber 27 is increased, the member 34 is moved to unseat the valve 39 until the pressure in the chamber 31 has increased a corresponding amount. An increase in the pressure supplied to the chamber 28 results in a decrease in the pressure in the chamber 31 by a corresponding amount. It will be seen that a pressure change in the chamber 30 results in an operation of the member 34 to effect a corresponding pressure change in the chamber 31. As shown herein, the conduits 11 and 12 are connected in communication with the chambers 27 and 28, respectively. A conduit 42 connects the chamber 30 in communication with a volume chamber 43 in which the pressure is varied by means that will shortly be described, and a conduit 44 connects the chamber 31 to a standardizing relay, generally designated 45.

The relay 45 is provided with pairs of chambers 46, 47 and 48, 49 separated by flexible partitions the same as in the relay 26. The chamber 46 is connected by a conduit 50 to a pilot valve 51 which is actuated by a device 52 operating in response to pressure differentials across an orifice 54 in the supply line 2. The device 52 positions the pilot valve 51 to supply a pressure to the chamber 46 varying inversely with the rate of flow in the supply conduit 2. The chamber 47 receives pressure from the conduit 44, and the chambers 48 and 49 are connected in communication with each other through a conduit 56 and a restricting valve 57. The chamber 49 is also connected by a conduit 60 to a diaphragm 61 which operates on an increase in the pressure supplied thereto to move the valve 3 toward its open position. A spring 62 for the relay 45 is adjusted so that the relay is balanced when a predetermined pressure differential exists between the chambers 46 and 47. Any change in this differential because of an increase or decrease of the pressure in the chamber 46 results in an unbalance of the relay to effect a continuing increase or decrease in the pressure supplied to the conduit 60. If the differential is changed because of an increase or decrease of the pressure in the chamber 47, then the relay is unbalanced to effect a continuing decrease or increase in the pressure supplied to the conduit 60. In other words a change of pressure in the chamber 46 alone results in a continuing change in the same direction of the pressure delivered to the conduit 60, but a change of the pressure in the chamber 47 alone results in a continuing change in the opposite direction of the pressure delivered. This relay is disclosed in the Dickey Patent 2,098,913, and it is not believed that it need be described further herein.

The operation of the system so far described is as follows. Assuming that the pressure within the accumulator is within the desired range and that the spring for the relay 45 is adjusted so that this relay operates to maintain a predetermined flow in the conduit 2. If the flow is at the proper value, then the pilot valve 51 is positioned by the device 52 to supply a pressure to the chamber 46 so as to balance the relay 45. An increase in the flow results in a positioning of the pilot valve 51 to reduce the pressure supplied to the chamber 46 so as to unbalance the relay and effect a continuing decrease in the pressure supplied through the conduit 60 for closing the valve 3. A decrease in the flow from the desired value results in an unbalance of the relay to effect an opening of the valve 3. Since the accumulator pressure was assumed to be within the desired range, the pilot valves 9 and 10 are held in their normal positions by the springs 15 and 18, and the pressures supplied to the chambers 27 and 28 are equal or zero. The relay 26 is then balanced to maintain a constant pressure supplied through the conduit 44 to the relay 45. If the supply of fluid through the conduit 2 effects an increase of the pressure in the accumulator to something over 160 p. s. i., the pressure responsive device 7 operates to raise the pilot valve 9 and increase the pressure supplied to the chamber 27. The relay 26 then operates to increase the pressure supplied through the conduit 44 to the relay 45, and the relay 45 is unbalanced by this increased pressure to effect a continuing decrease in the pressure supplied to the valve 3 for effecting a closing of the latter. As soon as the reduced flow in the conduit 2 has effected an operation of the device 52 to position the pilot valve 51 so as to increase the pressure in the chamber 46 by an amount equal to the increase in the chamber 47, then the relay 45 is again balanced and maintains the flow at which the balance was obtained. If fluid is used from the accumulator to cause the pressure therein to drop below the lower limit of the desired range, then the pressure responsive device 8 operates to move the valve 10 downwardly against the action of the spring 18 so as to increase the pressure supplied to the chamber 28 of the relay 26. This relay then operates to reduce the pressure supplied to the conduit 44, and the relay 45 is unbalanced to cause a continuing increase in the pressure supplied to the valve 3 for moving the latter toward its open position. As soon as the increased flow operates the device 52 to reduce the pressure in the chamber 46 by an amount equal to the pressure drop in the chamber 47, the relay 45 is again balanced and maintains the new rate of flow.

It may happen that the supply of fluid to the accumulator is greater than it need be to satisfy the demand. In this case the pressures in the accumulator would be held most of the time at the upper limit of the range. By providing means to bias the system so as to change its control point when the pressure exceeds the upper limit by a predetermined amount, it is possible to obtain a regulated flow which keeps the pressures better distributed within the range. For biasing the system there are provided pressure switches 65 and 66 subjected to the pressures in the conduits 11 and 12, respectively, and controlling the energizing of electrically operated valves 67 and 68 connected in air supply and relief conduits 69 and 70 communicating with the volume chamber 43. The valves 67 and 68 are normally in closed positions and are moved to their open positions when the switches 65 and 66 are caused to operate by an increase of the pressure in conduits 11 and 12 above a predetermined value. Arranged in the supply and relief conduits are valves 72 and 73 which are adjusted to pass only a restricted flow of air.

Assume that the switches 65 and 66 are operated by the pressures existing in the conduits 11 and 12 when the pressure in the accumulator has gone above or below the limits of its range by 3 p. s. i. As soon as the pressure exceeds its upper limit, the system operates as described above to reduce the flow in the conduit 2. When the accumulator pressure reaches 3 lb. over its upper limit, the pressure in the conduit 11 causes the switch 65 to operate and effect an opening of the valve 67. Air then passes to the volume chamber at a reduced rate to increase the pressure therein, and this increased pressure acts in the chamber 30 of the relay 26 to operate the member 34 for opening the valve 39 to increase the pressure supplied to the conduit 44. It will be appreciated that the pressures in the chambers 27 and 30 operate together to determine the pressure in the conduit 44, and the relay 45 is unbalanced by this pressure to effect a reduction in the flow through the conduit 2 until the device 52 increases the pressure in the chamber 46 by an amount sufficient to balance the relay 45. As the pressure in the accumulator returns to the upper limit value, the switch 65 operates to effect closure of the valve 67. Since the valves 67 and 68 are now both closed, the pressure in the volume chamber is held at the maximum value reached. The pressure in the chamber 27 of the relay 26 is reduced on the return of the accumulator pressure to its upper limit, but the pressure in the chamber 30 remains equal to that in the volume chamber, and the pressure supplied to the relay 45 remains greater than it was before the upper pressure limit was exceeded. The system remains biased by this amount until the accumulator pressure drops to a predetermined amount below the lower limit of its range. As soon as the pressure goes below the lower limit by this amount, the switch 66 operates to open the valve 68 and release some of the pressure from the volume chamber. Some of the bias is then removed, and, if the valve 68 remains open until the pressure in the volume chamber returns to atmospheric, all of the bias is removed. If the valve 67 is held open long enough when the upper limit is exceeded, then the bias may become great enough to effect a complete closure of the valve 3.

In Fig. 2 there is shown a system which operates to maintain the pressure within the accumulator at some predetermined value. In this case a pressure responsive device 75 is subjected to the pressure in the accumulator and operates to position a pilot valve 76 for controlling the supply of pressure through a conduit 77 and branch conduits 78 and 79 to standardizing relays 80 and 81 which are like the relay 45 of Fig. 1. Pressure fluid is supplied by the relays through conduits 82 and 83 to a relay 85 like the relay 26 of Fig. 1, and the relay 85 supplies pressure through a conduit 86 to the diaphragm 61 for positioning the valve 3 in the supply conduit 2. The conduit 78 communicates with the chamber 88 in the relay 80, and the pressure supplied thereto tends to move the member 89 upwardly against the action of the spring 90. The conduit 79 is connected to the chamber 93 of the relay 81, and an unbalance of this relay by a change of the pressure in the chamber 93 results in a continuing change in the same direction of the pressure in the chamber 94 communicating with the conduit 83. Arranged in the conduit 79 is a restricting valve 95 for permitting a slow change of the pressure supplied to the chamber 93. A volume chamber 96 is also connected in communication with the conduit 79 for reducing the rate of pressure change in the chamber 93. The chamber 93 of the relay 81 has pressure supplied thereto under the control of a pilot valve 99 which is positioned by a device 100 operating in response to changes in the rate of flow through the conduit 2. An unbalance of the relay 81 by a change of the pressure in the chamber 98 effects a continuing change in the opposite direction of the pressure in the chamber 94.

Pressure delivered by the relay 81 to the conduit 83 acts in the chamber 102 of the relay 85 in opposition to the pressure supplied by the conduit 82 to the chamber 103. A change of the pressure in the chamber 102 operates the relay 85 to effect an equal change in the same direction of the pressure supplied through the conduit 86, and a change of the pressure in the chamber 103 effects an equal change in the opposite direction of the pressure supplied to the conduit 86.

The operation of this form of the invention is as follows: The spring 90 for the relay 80 is adjusted to exert a force downwardly on the member 89 equal to or smaller than the upward force exerted by the pressure supplied to the chamber 88 when the pressure in the accumulator is at or below the value to be maintained. The springs for the relays 81 and 85 are adjusted so that the valve 3 is regulated to give the desired rates of flow for the different average pressures that may exist in the accumulator below a predetermined maximum. Assuming that these relays have their springs adjusted to produce zero effect on their operations, then the relay 81 is balanced when the pressures in its chambers 93 and 98 are equal, and the relay 85 delivers atmospheric pressure when the pressures in its chambers 102 and 103 are equal. If the pressure in the accumulator is reduced to some low value by opening the valve 5, then the device 75 positions the pilot valve to supply a comparatively high pressure through the conduit 77. This pressure acting in the chamber 88 unbalances the relay 80 to reduce continuously the pressure in the conduit 82 until it reaches atmospheric and the output of 85 comes under the control of 81. The high pressure in the conduit 77 acts in the chamber 93 of the relay 81 and unbalances the latter to increase the pressure supplied through the conduit 83 to the relay 85, and the relay 85 operates to produce a corresponding increase in the pressure supplied to the conduit 86. Valve 3 is opened by the pressure increase in the conduit 86, and the device 100 operates with an increase in the flow to increase the pressure supplied from the valve 99 to the chamber 98. The opening of the valve 3 continues until the pressure supplied to the chamber 98 equals the pressure in the chamber 93 and balances the relay. As long as the relay 81 remains balanced, the pressure supplied to the conduit 86 remains constant to hold the valve 3 in some fixed position. If the rate of flow changes for some reason, then the device 100 operates to vary the pressure in the chamber 98 so as to effect an operation of the relay to change the pressure in the conduit 86 in a direction to position the valve 3 for returning the flow to the value which effects a balance of the relay. As the pressure increases in the accumulator, the pressure in the conduit 77 is reduced, and the relay 81 is unbalanced to reduce the pressure supplied to the valve 3 until the flow is reduced to the value that effects an operation of the device 100 to supply a pressure to the chamber 98 that again balances the relay. The restricting valve 95 and the volume chamber 96 prevent rapid changes of pressure on the relay 81 when the accumulator pressure is suddenly reduced by opening the valve 5. The presure supplied to the chamber 93 of the relay 81 is, by reason of the volume chamber 96 and the restricting valve 95, a function of the average accumulator pressure rather than the actual accumulator pressure, and this pressure changes inversely with average accumulator pressure to effect an operation of the valve 3 in inverse proportion to the latter pressure.

When the accumulator pressure increases to a value slightly exceeding that at which the relay 80 is balanced, then the pressure in the conduit 77 is reduced to a point at which the spring 90 unbalances the relay and causes it to supply a continuously increasing pressure to the relay 85. The pressure supplied by the conduit 82 opposes the pressure supplied by the relay 81, and the relay 85 operates to reduce the pressure supplied to the valve 3 for effecting a closing movement of the latter. The reduction of flow in the conduit 2 may cause the device 100 to operate so as to unbalance the relay 81 for increasing the pressure supplied to the relay 85, but the relay 80 remains unbalanced to increase the pressure in the conduit 82 as long as the accumulator pressure remains above the predetermined value. Both of the relays 80 and 81 will soon deliver their maximum pressures to the relay 85, but these pressures oppose each other and, if equal, the pressure delivered to the valve 3 will be atmospheric. The valve 3 will therefore remain closed under influence of its spring until the valve 5 is again operated to reduce the pressure in the accumulator below the predetermined value.

Figure 3:
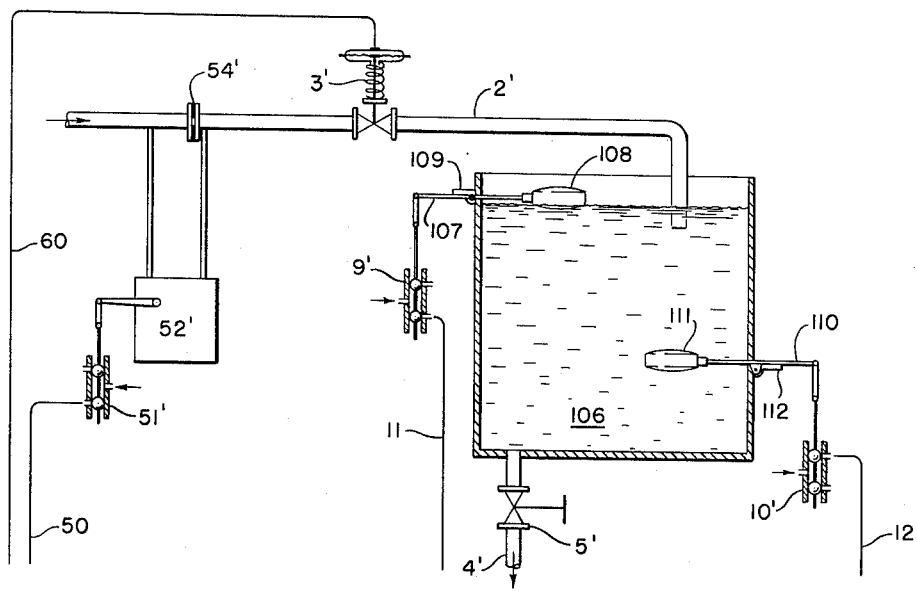
Figs. 3 and 4 show apparatus adapted to be connected in the system of Fig. 1 for controlling flow in response to different conditions in the accumulator.

Fig. 3 shows apparatus adapted to be used in the system of Fig. 1 for maintaining the level of liquid in a tank 106 within a predetermined range. A conduit 2' supplies liquid to the tank under the control of a pressure responsive valve 3', and a conduit 4' discharges liquid from the tank under the control of a manually operated valve 5'. Pilot valves 9' and 10' are connected into the system in the same manner as the valves 9 and 10 of Fig. 1. A pivoted lever 107 is connected to the pilot valve 9' and carries a float 108 which is raised when the liquid level exceeds the upper desired limit. A stationary abutment 109 is engaged by the lever to hold the latter in a fixed position when the level of the liquid drops below the upper limit. A lever 110 is connected to the pilot valve 10' and carries a float 111 which drops to swing the lever in a counterclockwise direction when the level of the liquid drops below the lower desired limit. A stationary abutment 112 is engageable by the lever 110 to limit its swing in a clockwise direction. When the liquid level is between the upper and lower limits, the levers are held in the positions shown and the pressure supplied by the pilot valves to the conduits 11 and 12 of the system are equal. If the level goes above the upper limit, the lever 109 positions the valve 9' to increase the pressure supplied to the conduit 11, and a drop in the level below the lower limit results in an operation of the lever 110 to position the valve 10' for increasing the pressure supplied to the conduit 12. A device 52' is responsive to pressure drops across an orifice 54' in the conduit 2' and regulates a pilot valve 51' in the same manner as Fig. 1. Relays operate in response to the pressures supplied by the pilot valves 9', 10', 51', and the volume chamber for regulating the operation of the valve 3', the same as in Fig. 1.

Figure 4:
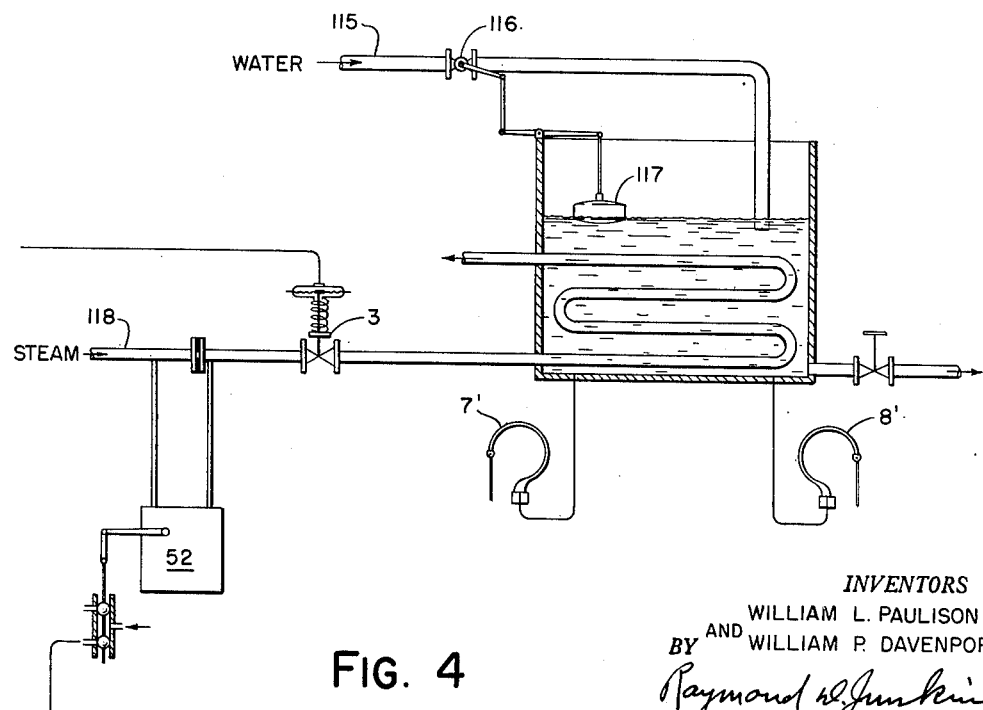

Fig. 4 shows another arrangement of apparatus with which the system of Fig. 1 is adapted to be used for maintaining temperature of a fluid within a predetermined range. In this case a heat exchanger has a liquid supplied thereto through a conduit 115, and a valve 116 is actuated by a float 117 to regulate the flow so as to maintain a given level. Passage means 118 supplies a heating fluid, such as steam, to the heat exchanger, and devices 7' and 8' are provided for positioning pilot valves, as in Fig. 1, in response to changes in temperature of the heated liquid. The devices 7' and 8' operate on changes in temperature above an upper limit and below a lower limit respectively, to determine pressures controlling the valve 3 in the passage means 118. The device 52 operates as in Fig. 1 to maintain the flow in the conduit 118 constant at the value determined by the temperature adjustment.

While there have been described in this application several forms which our invention may assume in practice, it will be understood that it may be modified and embodied in various other forms without departing from its spirit or the scope of the appended claims.

What we claim as new and desire to secure by Letters Patent of the United States, is:

1. A system for controlling the flow of fluid to an accumulator so as to maintain pressures therein within a predetermined range comprising, in combination, valve means for regulating the flow of fluid to said accumulator, means including a balanceable pressure responsive relay for controlling the operation of said valve means, said last mentioned means operating when the relay is unbalanced in one direction for closing said valve means and operating when unbalanced in the opposite direction for opening said valve means, means controlling the supply of a pressure to said relay for effecting its unbalance in one direction or the other in response to pressure changes in said accumulator, said last mentioned means including a second balanceable pressure responsive relay, means including devices responsive to the pressure in said accumulator and operating while the pressure therein is within said range for subjecting said second relay to balancing pressures, said devices operating on an increase or a decrease in the accumulator pressure above or below the limits of said range for unbalancing said second relay to effect an unbalance of said first mentioned relay, means responsive to the pressure supplied said second relay from one of said devices for subjecting said second relay to a biasing pressure when the accumulator pressure exceeds its upper limit by a predetermined amount, and means operating in response to the rate of fluid flow for subjecting said first mentioned relay to a rebalancing pressure.

2. The system of claim 1 including means responsive to the pressure supplied said second relay from the other of said devices for reducing the biasing pressure when the accumulator pressure drops below the lower limit of its range by a predetermined amount.

3. The system of claim 1 in which said means for adjusting said second relay to a biasing pressure includes a volume chamber connected to said second relay, a pressure fluid supply passage communicating with said volume chamber, valve means for controlling the flow of fluid through said supply passage, and means responsive to the pressure supplied from said one of said devices for controlling said last mentioned valve means.

4. A system for controlling the flow of fluid to an accumulator so as to maintain pressures therein within a predetermined range comprising, in combination, valve means for regulating the flow of fluid to said accumulator, means including a balanceable pressure responsive relay for controlling the operation of said valve means, said last mentioned means operating when the relay is unbalanced in one direction for closing said valve means and operating when unbalanced in the opposite direction for opening said valve means, means controlling the supply of a pressure to said relay for effecting its unbalance in one direction or the other in response to pressure changes in said accumulator, said last mentioned means including a second balanceable pressure responsive relay, means including devices responsive to the pressure in said accumulator and operating while the pressure therein is within said range for subjecting said second relay to balancing pressures, said devices operating on an increase or a decrease in the accumulator pressure above or below the limits of said range for unbalancing said second relay to effect an unbalance of said first mentioned relay, means responsive to the pressure supplied said second relay from said devices for regulating a biasing pressure acting on said second relay, said last mentioned means including a volume chamber connected to said second relay, pressure fluid supply and relief passages communicating with said volume chamber, separate valve means for controlling the flow of fluid through said supply and relief passages, means responsive to the pressure supplied from one of said devices for opening the valve means in said supply passage when the accumulator pressure exceeds the upper limit of its range by a predetermined amount, means responsive to the pressure supplied from the other of said devices for opening the valve means in said relief passage when the accumulator pressure drops below the lower limit of its range by a predetermined amount, and means operating in response to the rate of fluid flow to said accumulator for subjecting said first mentioned relay to a rebalancing pressure.

5. The system of claim 4 in which said means controlling the supply of pressure to said first mentioned relay operates on an unbalance of said second mentioned relay by an increase in the accumulator pressure above the upper limits of its range to effect an unbalance of said first relay in a direction to close said first mentioned valve means, and operates on an unbalance of said second relay by a drop in the accumulator pressure below the lower limit of its range to effect an unbalance of said first relay in a direction to open said first mentioned valve means.

6. A system for controlling the flow of fluid so as to maintain a pressure within a predetermined range including, valve means for regulating the flow of fluid affecting said pressure condition, means including a balanceable pressure responsive relay operative on unbalance for positioning said valve means, means controlling the supply of pressure to said relay for effecting its unbalance in one direction or the other in response to pressure changes, said last mentioned means including a second balanceable pressure responsive relay, means responsive to the pressure condition, linkage means adapted for positioning by the responsive means beyond the limits of predetermined values of the pressure condition, means actuated by the linkage means for establishing two separate balancing pressures in the second relay within the limits of the predetermined values of the pressure condition, said last mentioned means operating on an increase or decrease in the pressure above or below the limits of predetermined values of the pressure condition for unbalancing the second relay in one direction or the other, and means responsive to the rate of fluid flow for subjecting said first mentioned relay to a rebalancing pressure.

7. A system for controlling the supply of an agent to a condition to maintain the condition within a maximum and minimum range including, valve means controlling the agent supplied to the condition, means including a balanceable pressure responsive relay for controlling the operation of said valve means, said last mentioned means operating when the relay is unbalanced in one direction for closing said valve means and operating when unbalanced in the opposite direction for opening said valve means, means responsive to the condition, a first means adapted for positioning by the responsive means only beyond the maximum range of the condition, a second means adapted for positioning by the responsive means only beyond the minimum range of the condition, third means positioned by one of the said first and second means for unbalancing the relay in one direction, fourth means positioned by the other of said first and second means for unbalancing the relay in the opposite direction, and fifth means operating in response to the rate of the agent supply for rebalancing the relay.

8. The system of claim 7 including means for biasing said relay when the upper limit of the range is exceeded by a predetermined amount, and means for reducing said bias when the condition drops a predetermined amount below the lower limit of said range.

9. The system of claim 7 wherein liquid level in a container is the condition to be maintained and said valve means regulates the flow of liquid to said container.

10. The system of claim 9 including first biasing means responsive to the third means for subjecting the third means to a biasing pressure when the liquid level in the container exceeds the maximum range by a predetermined amount.

11. The system of claim 10 wherein second biasing means is responsive to the fourth means when the fourth means is positioned by the second means in order to reduce the biasing pressure when the liquid level in the container drops below the minimum range by a predetermined amount.

12. The system of claim 7 wherein temperature of a fluid within a container is a condition to be maintained, and said valve means regulates the flow of heating medium to said container.

13. The system of claim 12 including means controlled by one of the said temperature responsive devices and operating when the temperature exceeds the upper limit of the range by a predetermined amount for biasing said second relay, and the means controlled by the other of said devices and operating when the temperature is below the lower limit of the range by a predetermined amount for reducing said bias.

14. A system for controlling the flow of fluid to a container so as to maintain a condition therein within a predetermined range including, in combination, valve means for regulating the flow of fluid to said container, means including a balanceable pressure responsive relay for controlling the operation of said valve means, said last mentioned means operating when the relay is unbalanced in one direction for closing said valve means and operating when unbalanced in the opposite direction for opening said valve means, means controlling the supply of the pressure to said relay for effecting its unbalance in one direction or the other in response to condition variation in said container, said last mentioned means including a second balanceable pressure responsive relay, means including devices responsive to the condition in said container and operating while the condition therein is within said range for subjecting said second relay to balancing pressures, said devices operating on an increase or a decrease in the condition within the container above or below the limit of said range for unbalancing said second relay to effect an unbalance of said first mentioned relay, means responsive to the pressure supplied said second relay from one of said devices for subjecting said second relay to a biasing pressure when the condition in the container exceeds its upper limit by a predetermined amount, and means operating in response to the rate of fluid flow for subjecting said first mentioned relay to a rebalancing pressure.

15. A system for controlling the supply of fluid to a vessel for maintaining pressures therein within a predetermined range including; pressure responsive valve means for regulating the flow of fluid to the vessel; a first pressure responsive relay adapted to be unbalanced in opposite directions, means communicating pressure fluid at increasing or decreasing pressure from said relay to said valve means; two devices responsive to the vessel pressures, a plurality of fluid pressure establishing means, linkage means for each device connected to separate ones of said fluid pressure establishing means, said linkage means adapted for movement only beyond a predetermined range of vessel pressures, said fluid pressure establishing means establishing fluid pressures in accordance with the position of said linkage means, a second pressure responsive relay connected to said fluid pressure establishing means and adapted to receive the fluid pressures established thereby, said second pressure responsive relay establishing an output fluid pressure, said output pressure communicated to said first relay whereby said first relay is unbalanced; and means responsive to the rate of flow of fluid to the vessel for establishing a pressure to rebalance the first pressure responsive relay.

16. The system of claim 15 including means for establishing a pressure to bias the second pressure responsive relay when the vessel pressure exceeds the upper limit of the range by a predetermined amount, and means for reducing said biasing pressure when the vessel pressure drops below the lower limit of the range by a predetermined amount.

References Cited in the file of this patent

UNITED STATES PATENTS

| Number | Name | Date |
|---|---|---|
| 2,016,824 | Smith | Oct. 8, 1935 |
| 2,098,913 | Dickey | Nov. 9, 1937 |
| 2,257,905 | Gorrie | Oct. 7, 1941 |